(12) United States Patent
Tanaka

(10) Patent No.: US 11,381,706 B2
(45) Date of Patent: Jul. 5, 2022

(54) IMAGE PROCESSING APPARATUS AND NON-TRANSITORY COMPUTER READABLE MEDIUM STORING INFORMATION PROCESSING PROGRAM FOR REARRANGING CONTENT OF AN IMAGE TO IMPROVE VISIBILITY OF THE CONTENT

(71) Applicant: FUJIFILM BUSINESS INNOVATION CORP., Tokyo (JP)

(72) Inventor: Noriaki Tanaka, Kanagawa (JP)

(73) Assignee: FUJIFILM Business Innovation Corp., Tokyo (JP)

(*) Notice: Subject to any disclaimer, the term of this patent is extended or adjusted under 35 U.S.C. 154(b) by 0 days.

(21) Appl. No.: 16/837,147

(22) Filed: Apr. 1, 2020

(65) Prior Publication Data
US 2021/0029268 A1 Jan. 28, 2021

(30) Foreign Application Priority Data
Jul. 24, 2019 (JP) .............................. JP2019-136129

(51) Int. Cl.
*H04N 1/387* (2006.01)
*H04N 1/00* (2006.01)

(52) U.S. Cl.
CPC ......... *H04N 1/3876* (2013.01); *H04N 1/0044* (2013.01); *H04N 1/00307* (2013.01); *H04N 1/3872* (2013.01)

(58) Field of Classification Search
None
See application file for complete search history.

(56) References Cited

U.S. PATENT DOCUMENTS

| | | | |
|---|---|---|---|
| 6,690,482 B1* | 2/2004 | Toyoda | H04N 1/3876 382/284 |
| 8,819,543 B2* | 8/2014 | Igari | G06F 40/114 345/468 |
| 9,251,444 B2 | 2/2016 | Ozawa et al. | |
| 2006/0209366 A1* | 9/2006 | Edwards | H04N 1/3876 358/449 |
| 2008/0231869 A1* | 9/2008 | Morimoto | G09G 5/00 358/1.1 |
| 2009/0279108 A1* | 11/2009 | Hoshi | H04N 1/3935 358/1.9 |
| 2011/0170122 A1* | 7/2011 | Kihara | H04N 1/3875 358/1.9 |
| 2012/0092712 A1* | 4/2012 | Matsumoto | G06F 3/1208 358/1.15 |
| 2014/0376019 A1* | 12/2014 | Ozawa | G06K 15/1849 358/1.13 |
| 2021/0234987 A1* | 7/2021 | Sadowara | H04N 1/3875 |

FOREIGN PATENT DOCUMENTS

JP 2015-003391 A 1/2015

* cited by examiner

*Primary Examiner* — Mohammad H Ghayour
*Assistant Examiner* — Pawan Dhingra
(74) *Attorney, Agent, or Firm* — Oliff PLC

(57) ABSTRACT

An image processing apparatus includes a processor configured to position a content image based on content data in a first area of a recording medium, and position a partial target image contained in the content image in a second area of the recording medium different from the first area.

9 Claims, 14 Drawing Sheets

IMAGE PROCESSING APPARATUS AND NON-TRANSITORY COMPUTER READABLE MEDIUM STORING INFORMATION PROCESSING PROGRAM FOR REARRANGING CONTENT OF AN IMAGE TO IMPROVE VISIBILITY OF THE CONTENT

CROSS-REFERENCE TO RELATED APPLICATIONS

This application is based on and claims priority under 35 USC 119 from Japanese Patent Application No. 2019-136129 filed Jul. 24, 2019.

BACKGROUND

(i) Technical Field

The present disclosure relates to an image processing apparatus and a non-transitory computer readable medium storing an information processing program.

(ii) Related Art

Japanese Unexamined Patent Application Publication No. 2015-3391 describes an image forming apparatus including a printing control program. The image forming apparatus includes a display, a data receiver, an analyzer, and a rasterizer. The data receiver receives print data. The analyzer analyzes the print data to determine the file format of the print data. Depending on whether the file format of the print data is a specific file format, the analyzer causes the display to display different print setting screens. In response to print settings made on the print setting screen, the analyzer determines the layout of objects in each page, and converts the print data into an intermediate language. The rasterizer rasterizes the intermediate language to generate a print image.

SUMMARY

Aspects of non-limiting embodiments of the present disclosure relate to the following circumstances. A mobile device such as a smartphone has a screen that displays a vertically long image based on content data (hereinafter referred to as "content image"). If the vertically long content image is output as it is onto a recording medium by using an image processing apparatus, the visibility of a part of the content image may become lower than that of the other part of the content image.

It is desirable to improve the visibility of the part of the content image compared with the case where the vertically long content image is output as it is onto the recording medium.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an image processing apparatus comprising a processor configured to position a content image based on content data in a first area of a recording medium, and position a partial target image contained in the content image in a second area of the recording medium different from the first area.

BRIEF DESCRIPTION OF THE DRAWINGS

Exemplary embodiments of the present disclosure will be described in detail based on the following figures, wherein.

DETAILED DESCRIPTION

First Exemplary Embodiment

Figure 1:
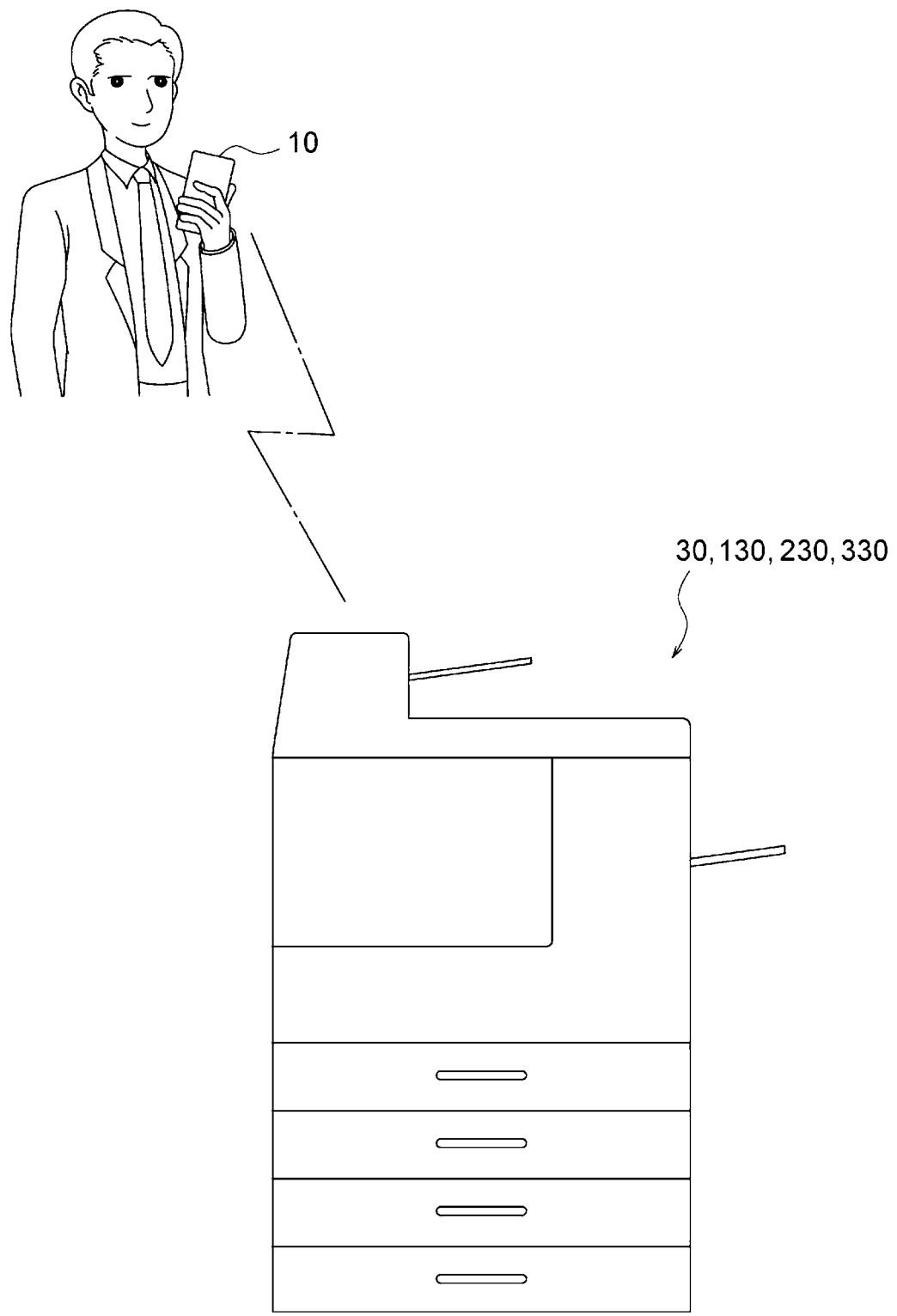
FIG. 1 illustrates an image processing apparatus according to a first exemplary embodiment of the present disclosure and a smartphone that transmits content data to the image processing apparatus.

Examples of an image processing apparatus and an information processing program according to a first exemplary embodiment of the present disclosure are described with reference to FIG. 1 to FIG. 11. In the drawings, the same or equivalent components and parts are represented by the same reference symbols. Dimensional ratios of the drawings are exaggerated for convenience of description and may differ from actual ratios.

FIG. 1 illustrates the overall configuration of an image processing system including an image processing apparatus 30 according to this exemplary embodiment.

(Overall Configuration)

As illustrated in FIG. 1, the image processing system includes a smartphone 10 and the image processing apparatus 30. The smartphone 10 is an example of a mobile device. The image processing apparatus 30 is communicable with the smartphone 10.

[Smartphone 10]

Figure 2:
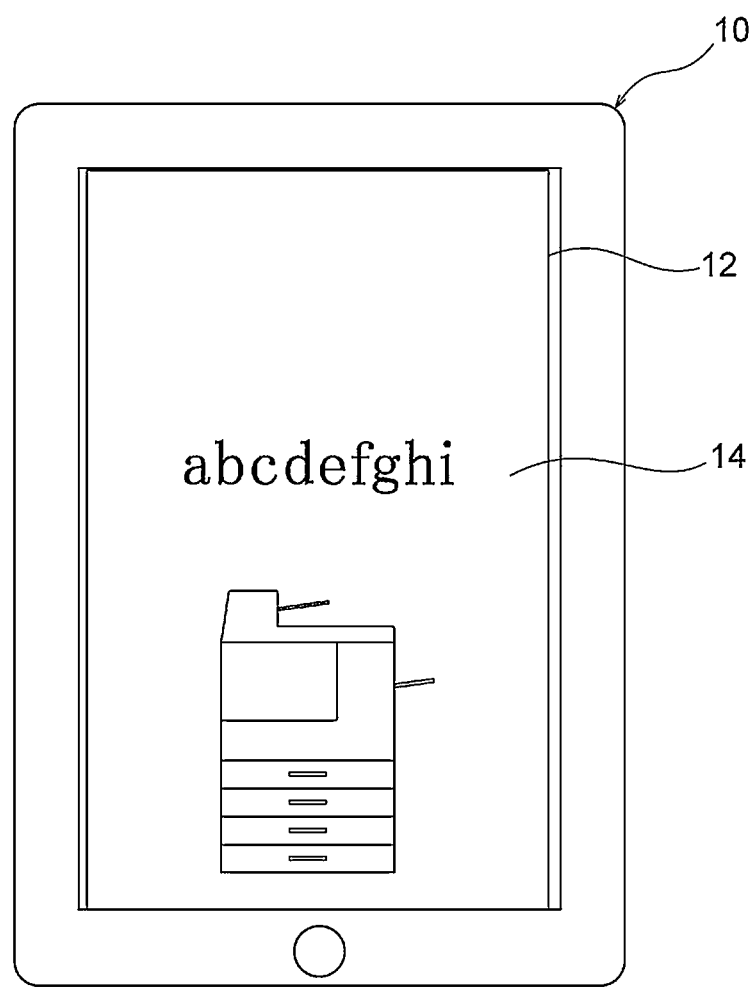
FIG. 2 illustrates a screen of the smartphone that transmits content data to the image processing apparatus according to the first exemplary embodiment of the present disclosure.
Figure 3:
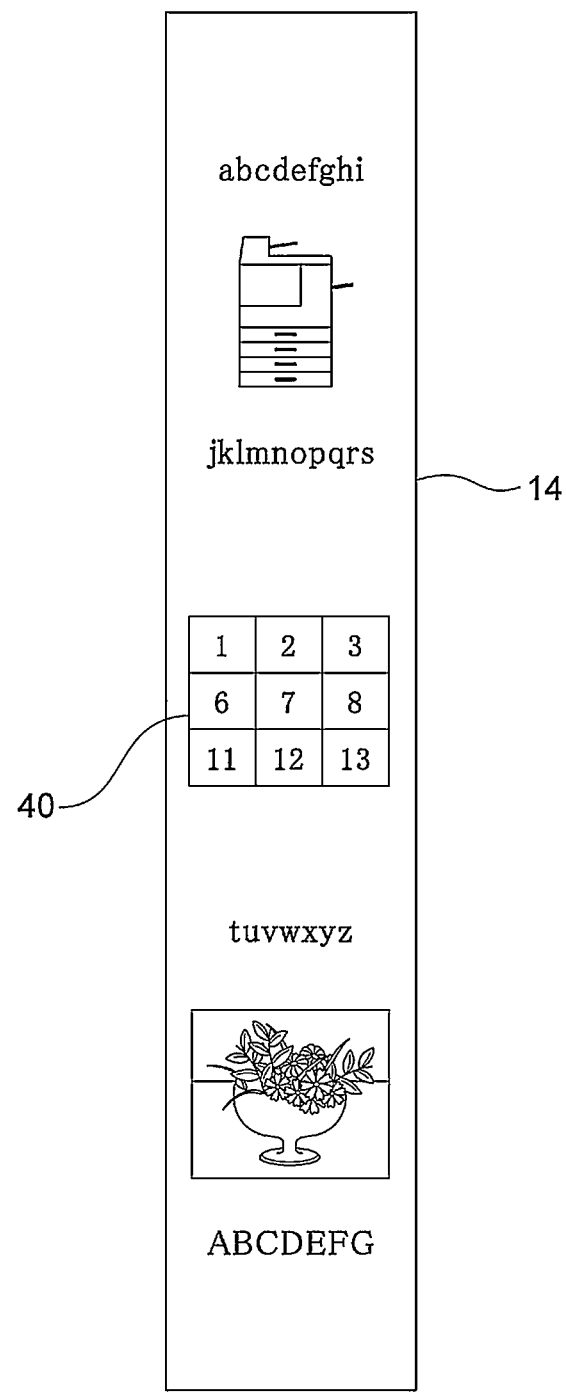
FIG. 3 illustrates an image based on content data to be transmitted to the image processing apparatus according to the first exemplary embodiment of the present disclosure.

As illustrated in FIG. 2, the smartphone 10 has a display screen 12 that displays a part of an image 14 (hereinafter referred to as "content image 14") based on content data downloaded from an external server. Examples of the content data include PDF data. As illustrated in FIG. 3, the content image 14 is so vertically long that the display screen 12 does not display the entire content image 14 at a time. The content image 14 contains a plurality of objects (partial images). A user of the smartphone 10 vertically scrolls the content image 14 to view the entire content image 14 sequentially appearing on the display screen 12. Processing for the vertically long image 14 is described below, but the image may be a horizontally long image, the entire content of which may be viewed by scrolling the image horizontally. The smartphone 10 has an installed application that transmits content data to a selected image processing apparatus 30 by using a wireless LAN to output an image onto a recording medium P based on the content data.

The term "vertically" refers to a vertical direction when the display screen 12 is set along the gravity direction.

[Image Processing Apparatus 30]

The image processing apparatus 30 receives content data from the smartphone 10 and outputs (prints) a content image 14 onto a recording medium P.

—Hardware Configuration of Image Processing Apparatus 30—

Figure 4:
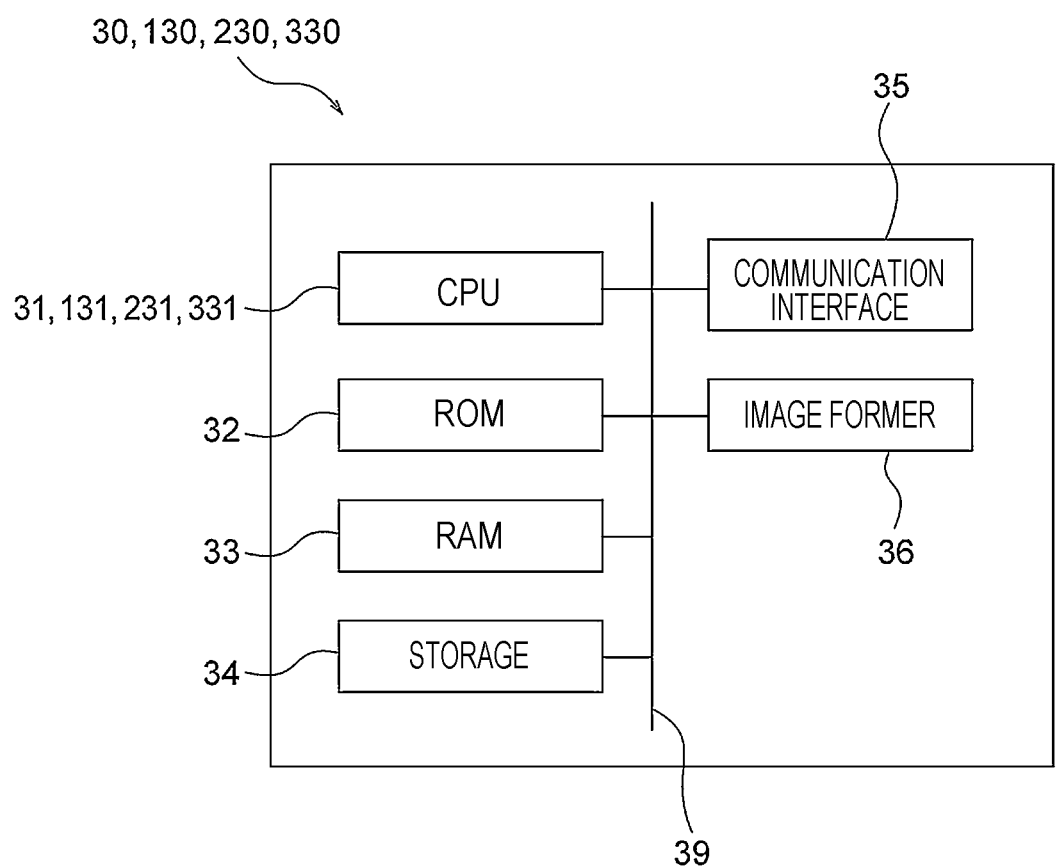
FIG. 4 is a block diagram illustrating the hardware configuration of the image processing apparatus according to the first exemplary embodiment of the present disclosure.

FIG. 4 is a block diagram illustrating the hardware configuration of the image processing apparatus 30.

As illustrated in FIG. 4, the image processing apparatus 30 includes a central processing unit (CPU) 31, a read only memory (ROM) 32, a random access memory (RAM) 33, a storage 34, a communication interface (I/F) 35, and an image former 36. Those components are connected together via a bus 39 in a communicable manner.

The CPU 31 executes various programs and controls the components. The CPU 31 reads a program from the ROM 32 or the storage 34 and executes the program on the RAM 33 serving as a working area. The CPU 31 controls the components and performs various types of arithmetic processing based on the programs stored in the ROM 32 or the storage 34. In this exemplary embodiment, the ROM 32 or the storage 34 stores the information processing program that outputs, onto a recording medium P, a content image 14 based on content data received from the smartphone 10.

The ROM 32 stores various programs and data. The RAM 33 temporarily stores a program or data as a working area. The storage 34 is a hard disk drive (HDD) or a solid state drive (SSD), which stores various data and programs including an operating system. The communication interface 35 enables the image processing apparatus 30 to communicate with the smartphone 10 or other mobile devices. Examples of the communication interface 35 include Ethernet (registered trademark), FDDI, and Wi-Fi (registered trademark).

The image former 36 includes a developing device, a transfer device, and a fixing device (not illustrated) and forms an image on a recording medium P such as paper.

To execute the information processing program, the image processing apparatus 30 uses the hardware resources described above to implement various functions. The functional configuration to be implemented by the image processing apparatus 30 is described.

Functional Configuration of Image Processing Apparatus 30—

The CPU 31 of the image processing apparatus 30 positions a content image 14 in a first area 42 of a recording medium P, and positions a target image contained in the content image 14 in a second area 44 of the recording medium P different from the first area 42 to improve visibility. In other words, the CPU 31 splits the entire recording medium P into the first area 42 and the second area 44. The content image 14 is positioned in the first area 42. The target image in the content image 14 is positioned in the second area 44 to improve visibility. The "positioning of images" means that images are allocated in specific print areas of the recording medium P by data processing. The "positioning of images" may also mean that images are actually printed on the recording medium P by the image former 36.

Figure 5:
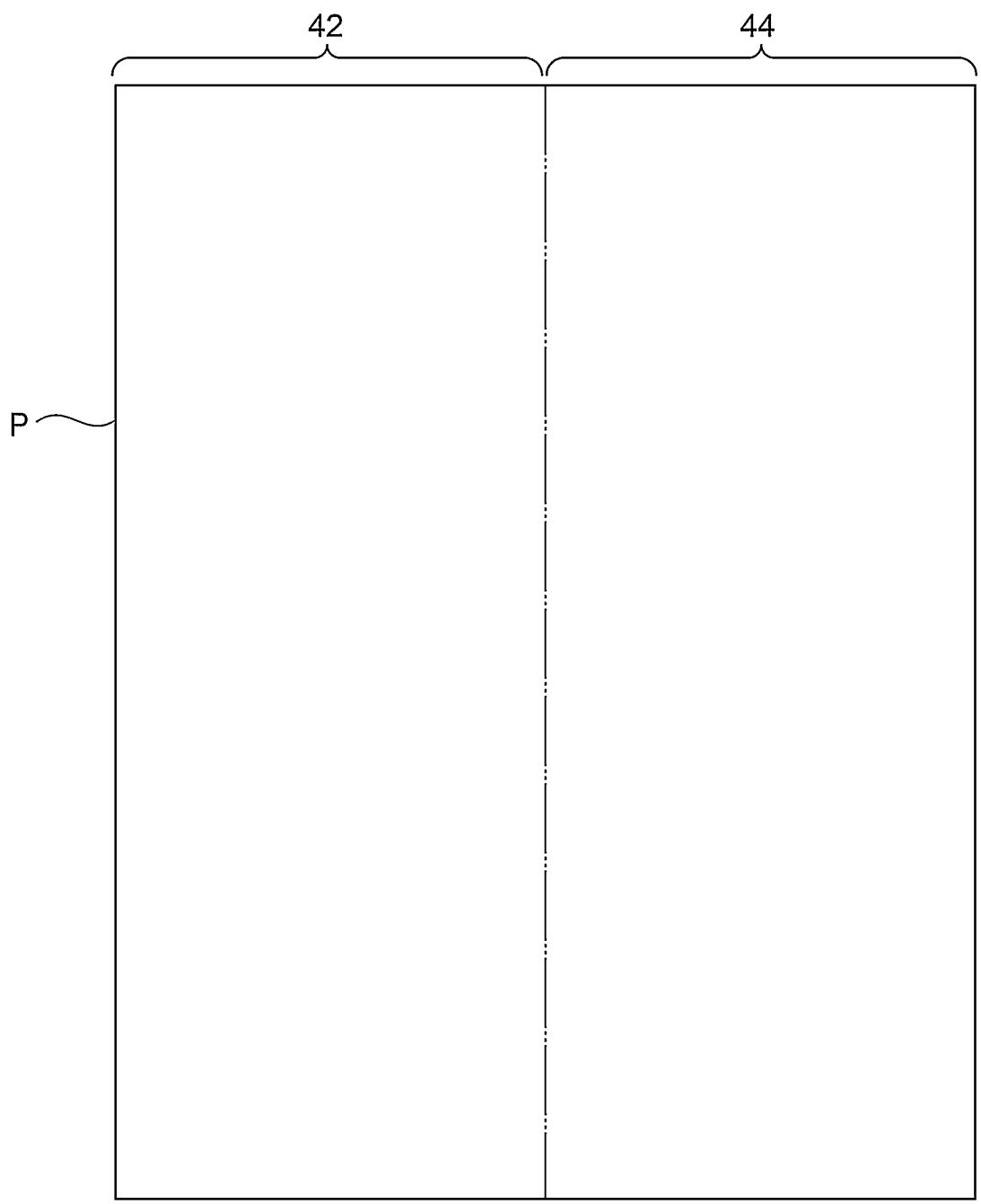
FIG. 5 is a plan view illustrating a recording medium for use in the image processing apparatus according to the first exemplary embodiment of the present disclosure.

As illustrated in FIG. 5, the CPU 31 splits the entire recording medium P into two areas arranged in a short-side direction of the recording medium P (lateral direction in the drawing sheet). The CPU 31 defines one of the areas (left area) as the first area 42 and the other area (right area) as the second area 44. That is, the CPU 31 defines the first area 42 and the second area 44 arranged in a width direction of the recording medium P.

The "width direction of the recording medium P" is a horizontal direction when the recording medium P is set along the gravity direction.

Figure 6:
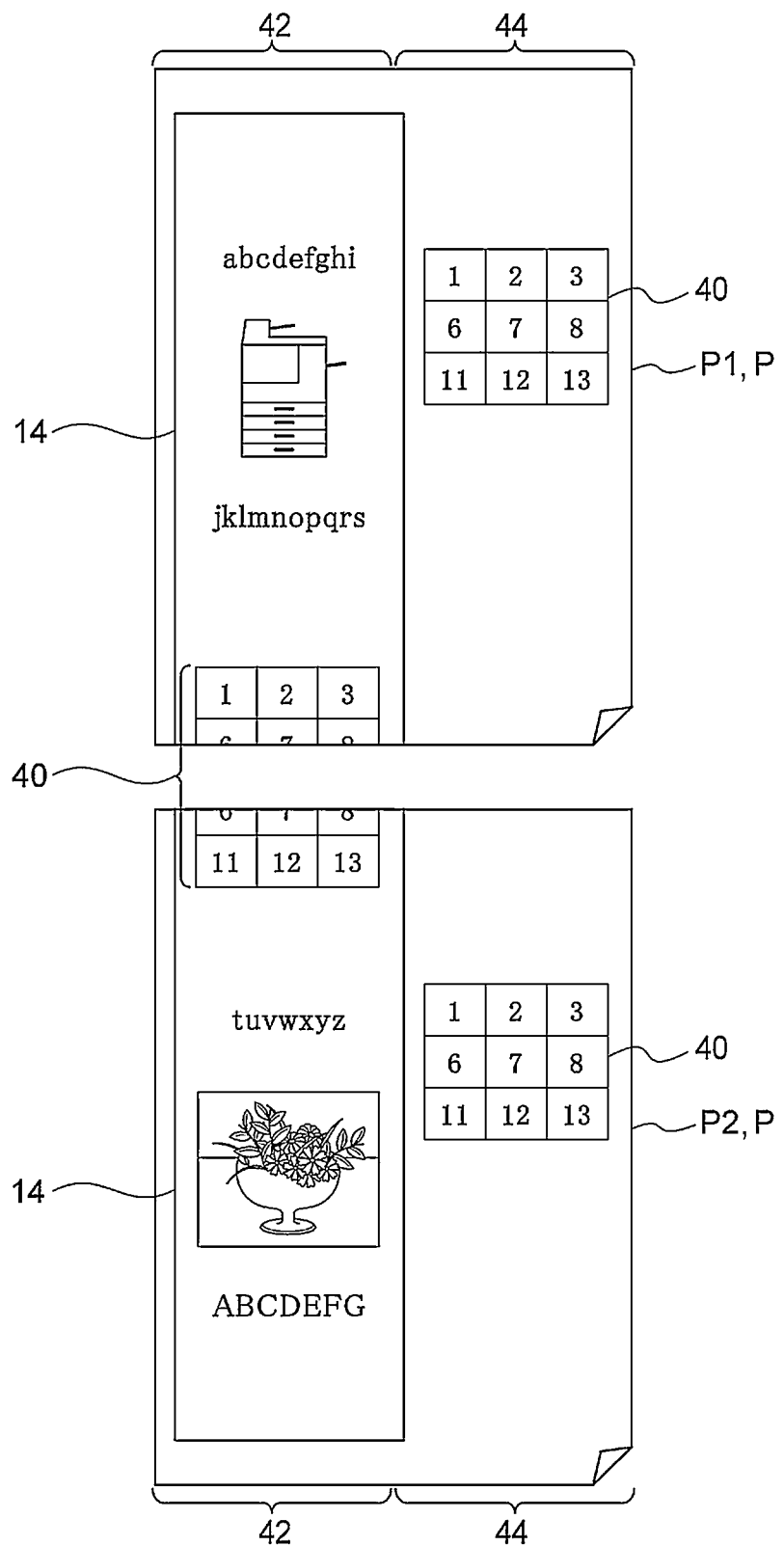
FIG. 6 illustrates an image based on content data output from the image processing apparatus according to the first exemplary embodiment of the present disclosure.

For example, the CPU 31 of the image processing apparatus 30 positions the content image 14 of FIG. 3 in the first area 42 of the recording medium P. As illustrated in FIG. 6, a partial image showing a table in the content image 14 is positioned over a first recording medium P (hereinafter referred to as "recording medium P1") and a second recording medium P (hereinafter referred to as "recording medium P2"). In this case, the CPU 31 defines this partial image (object) as a target image 40 and positions the target image 40 in the second areas 44 of both the recording medium P1 and the recording medium P2. Thus, the CPU 31 has a function of combining two segment images positioned over the recording media into one image and positioning the one image in the second areas 44.

Figure 7:
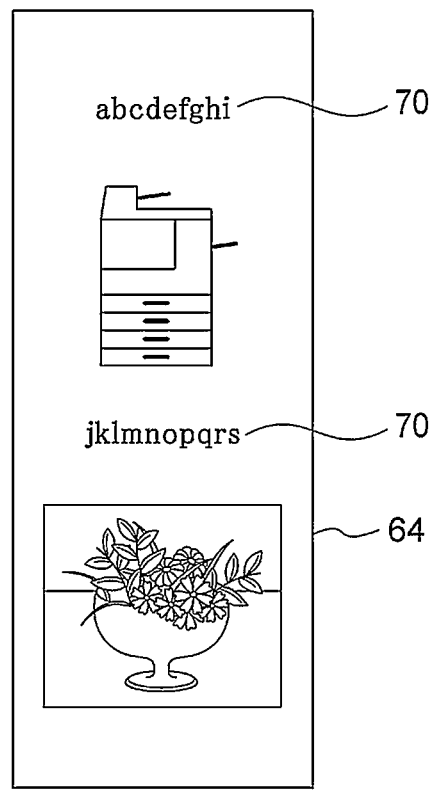
FIG. 7 illustrates an image based on content data to be transmitted to the image processing apparatus according to the first exemplary embodiment of the present disclosure.
Figure 8:
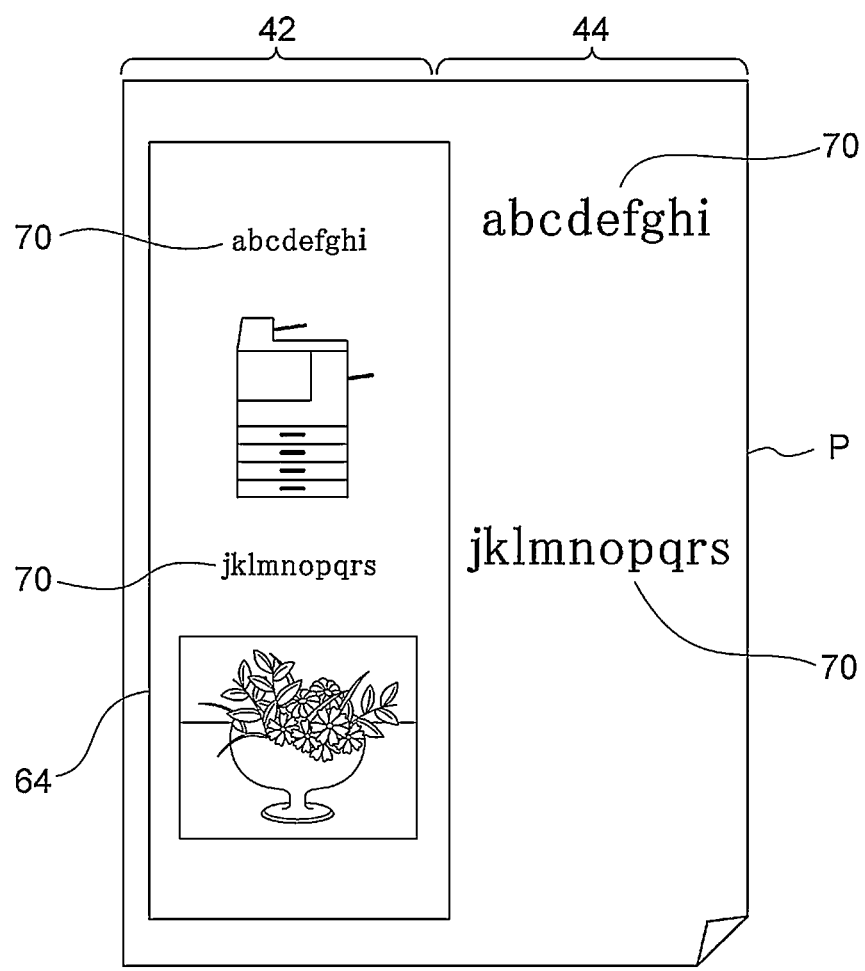
FIG. 8 illustrates an image based on content data output from the image processing apparatus according to the first exemplary embodiment of the present disclosure.

The CPU 31 of the image processing apparatus 30 positions a content image 64 of FIG. 7 in the first area 42 of the recording medium P. As illustrated in FIG. 8, the content image 64 contains partial images as text images or images including text with their text size equal to or smaller than a predetermined threshold. In this case, the CPU 31 defines those partial images as target images 70 and positions the target images 70 in the second area 44 on enlarged scales compared with those of the original images. Thus, the CPU 31 has a function of positioning an image in the second area 44 with its small text enlarged.

The image may be enlarged on a scale of preferably two, more preferably three, and particularly preferably four or more.

(Operations)

Figure 9:
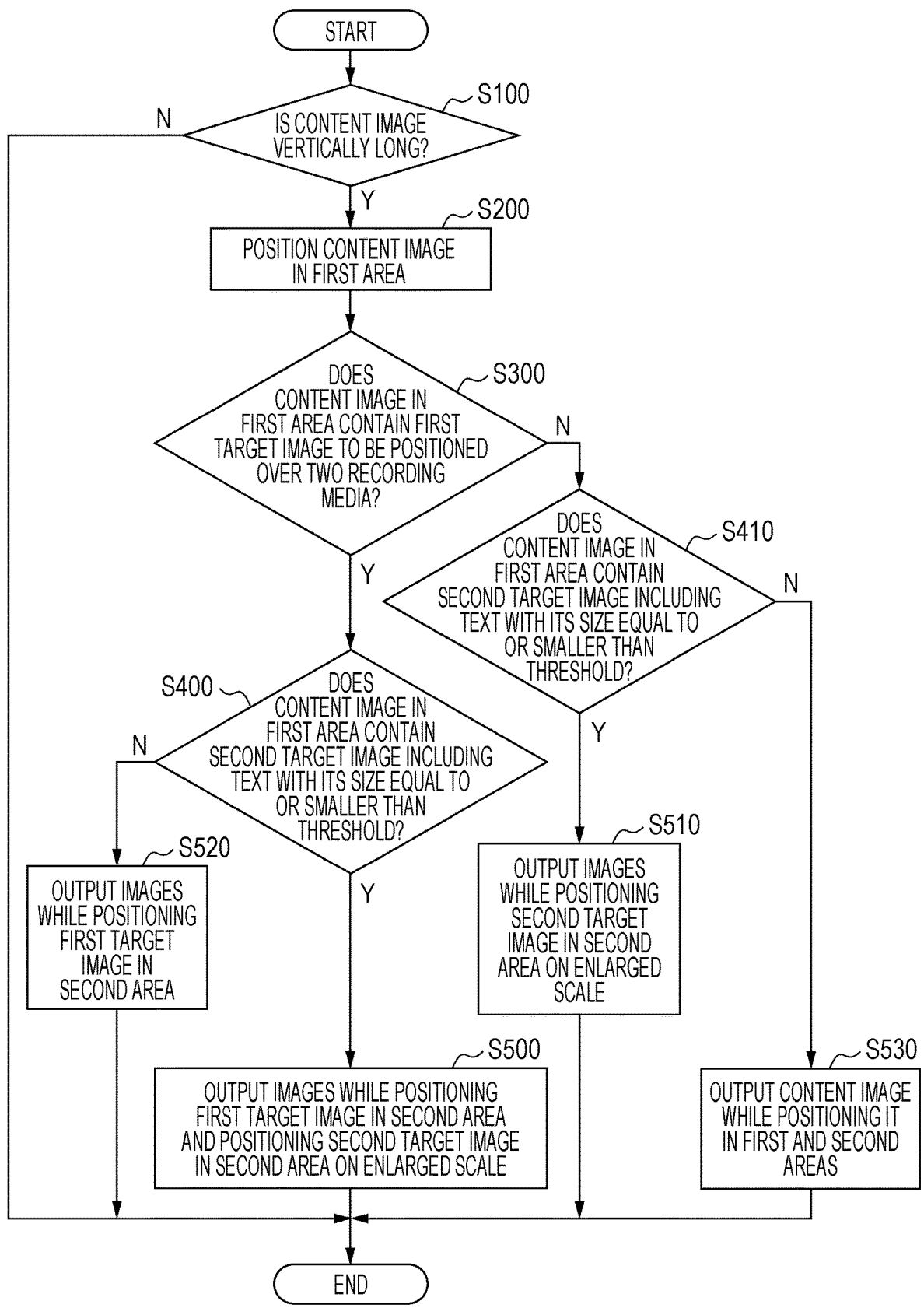
FIG. 9 is a flowchart illustrating a processing flow of the image processing apparatus according to the first exemplary embodiment of the present disclosure.
Figure 10:
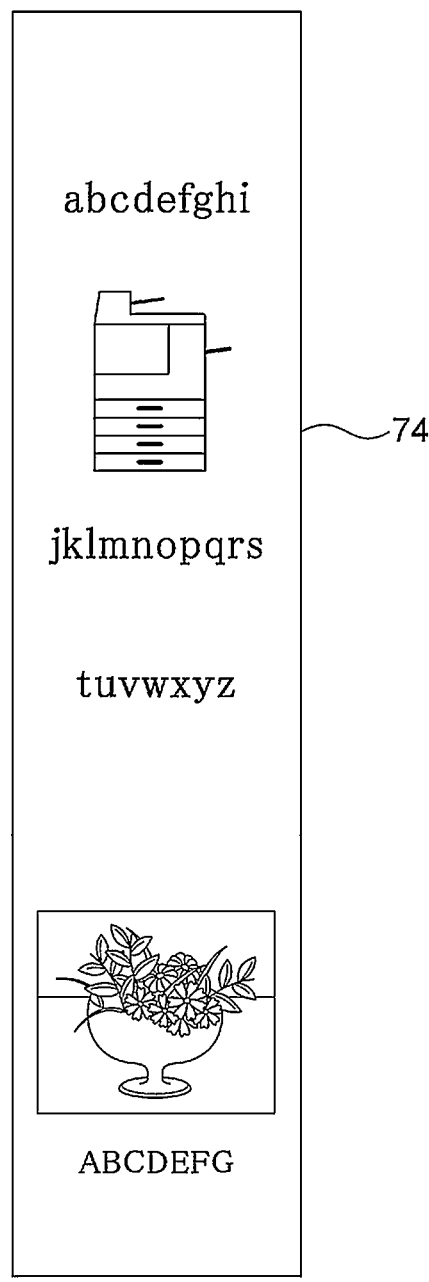
FIG. 10 illustrates an image based on content data to be transmitted to the image processing apparatus according to the first exemplary embodiment of the present disclosure.

Next, operations of the image processing apparatus 30 are described with reference to a flowchart of FIG. 9.

The user transmits content data of a content image 14 displayed on the smartphone 10 to a selected image processing apparatus 30 by using a wireless LAN. In Step S100 of FIG. 9, the CPU 31 receives the content data. The CPU 31 determines whether the content image of the received content data is vertically long. For example, the CPU 31 determines whether the vertical length of the content image is larger than the horizontal length. If the content image is vertically long (Step S100: Y), the CPU 31 proceeds to Step S200. If the content image is not vertically long (Step S100: N), the CPU 31 outputs (prints) the content image as it is onto a recording medium P and terminates the series of operations.

The "output of the content image as it is onto the recording medium P" means that the content image alone is output onto the recording medium P at a preset scaling factor.

In Step S200, the CPU 31 positions the content image in the first area 42 of the recording medium P (see FIG. 5).

In Step S300, the CPU 31 determines whether the content image in the first area 42 contains a first target image to be positioned over two recording media P. If the content image contains the first target image (Step S300: Y), the CPU 31 proceeds to Step S400. If the content image does not contain the first target image (Step S300: N), the CPU 31 proceeds to Step S410.

In Step S400, the CPU 31 determines whether the content image in the first area 42 contains a second target image including text with its size equal to or smaller than a threshold. If the content image contains the second target image (Step S400: Y), the CPU 31 proceeds to Step S500. If the content image does not contain the second target image (Step S400: N), the CPU 31 proceeds to Step S520.

In Step S500, the CPU 31 positions the first target image 40 in each second area 44 as illustrated in FIG. 6, and positions the second target image 70 in the second area 44 on an enlarged scale compared with that of the original image as illustrated in FIG. 8. The CPU 31 outputs (prints), onto the recording media P, the content image positioned in the first area 42 and the first and second target images positioned in the second area 44.

If the content image in the first area 42 does not contain the first target image in Step S300 (Step S300: N), the CPU 31 determines in Step S410 whether the content image in the first area 42 contains a second target image including text with its size equal to or smaller than the threshold. If the content image contains the second target image (Step S410: Y), the CPU 31 proceeds to Step S510. If the content image does not contain the second target image (Step S410: N), the CPU 31 proceeds to Step S530.

In Step S510, the CPU 31 positions the second target image 70 in the second area 44 on an enlarged scale compared with that of the original image as illustrated in FIG. 8. The CPU 31 outputs (prints), onto the recording medium P, the content image positioned in the first area 42 and the second target image positioned in the second area 44.

Figure 11:
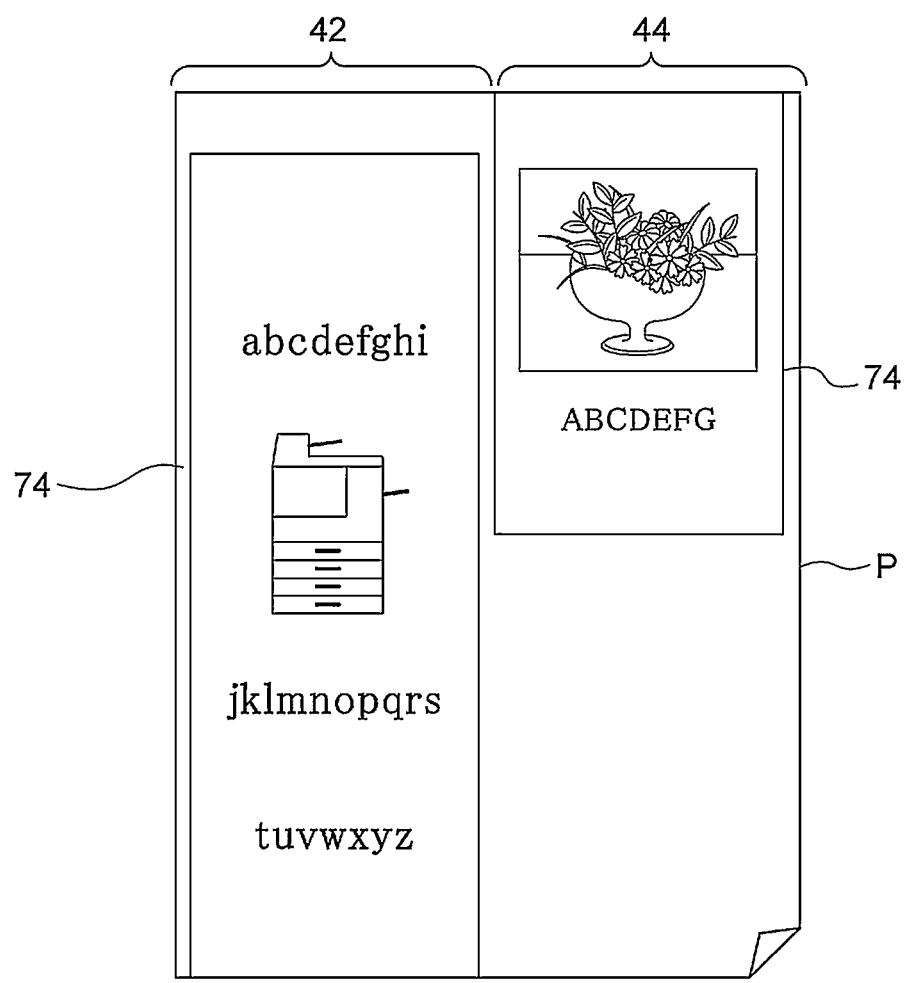
FIG. 11 illustrates an image based on content data output from the image processing apparatus according to the first exemplary embodiment of the present disclosure.

If the content image in the first area 42 does not contain the second target image in Step S410 (Step S410: N), the CPU 31 outputs (prints) the content image while positioning the content image also in the second area in Step S530. For example, in a case of a content image 74 of FIG. 10, the CPU 31 outputs the content image 74 while positioning the content image 74 also in the second area 44 as illustrated in FIG. 11.

If the content image in the first area 42 does not contain the second target image in Step S400 (Step S400: N), the CPU 31 outputs the images while positioning the first target image 40 in each second area 44 in Step S520 as illustrated in FIG. 6.

SUMMARY

The CPU 31 of the image processing apparatus 30 positions, in the second area 44, the target image 40 to be positioned over the recording medium P1 and the recording medium P2 (see FIG. 6). Further, the CPU 31 positions, in the second area 44, the target image 70, which is a text image or an image including text with its text size equal to or smaller than the threshold, on an enlarged scale compared with that of the original image (see FIG. 8).

The CPU 31 defines the first area 42 and the second area 44 arranged in the width direction of the recording medium P.

The CPU 31 defines the partial image to be positioned over the recording medium P1 and the recording medium P2 as the target image 40 and positions the target image 40 in the second area 44 (see FIG. 6).

The CPU 31 positions the target image 40 to be positioned over the recording medium P1 and the recording medium P2 in the second areas 44 of both the recording medium P1 and the recording medium P2.

The CPU 31 defines, as the target image 70, the partial image that is a text image or an image including text with its text size equal to or smaller than the threshold, and positions the target image 70 in the second area 44 on an enlarged scale compared with that of the original image (see FIG. 8).

The CPU 31 reads the information processing program and executes the information processing program.

Second Exemplary Embodiment

Next, examples of an image processing apparatus and an information processing program according to a second exemplary embodiment of the present disclosure are described with reference to FIG. 12. In the second exemplary embodiment, a difference from the first exemplary embodiment is described below.

Figure 12:
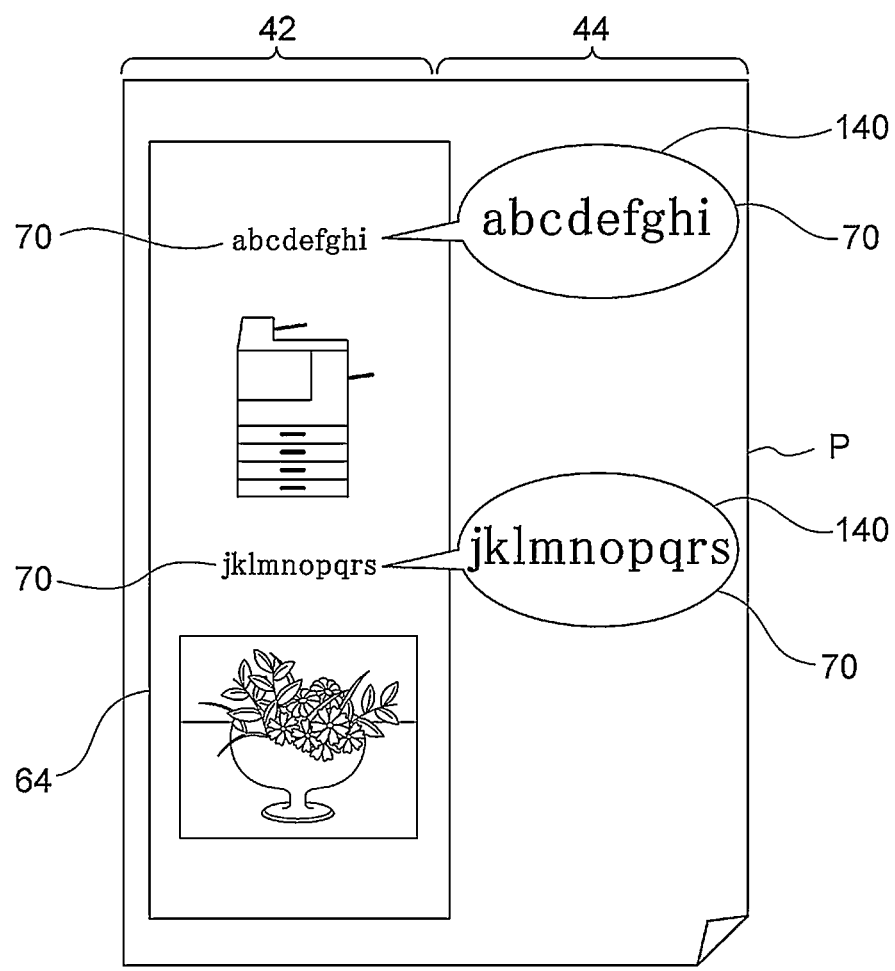
FIG. 12 illustrates an image based on content data output from an image processing apparatus according to a second exemplary embodiment of the present disclosure.

A CPU 131 (see FIG. 4) of an image processing apparatus 130 according to the second exemplary embodiment positions the content image 64 of FIG. 7 in the first area 42 of the recording medium P as illustrated in FIG. 12. Further, the CPU 131 positions, in the second area 44, the target image 70 in the content image 64, which is a text image or an image including text with its text size equal to or smaller than the threshold, on an enlarged scale compared with that of the original image.

The CPU 131 positions an associative image 140 on the recording medium P. The associative image 140 associates the target image 70 in the content image 64 positioned in the first area 42 with the target image 70 positioned in the second area 44. For example, the CPU 131 positions a word balloon on the recording medium P as the associative image 140.

Third Exemplary Embodiment

Next, examples of an image processing apparatus and an information processing program according to a third exemplary embodiment of the present disclosure are described with reference to FIG. 13. In the third exemplary embodiment, differences from the first exemplary embodiment are described below.

Figure 13:
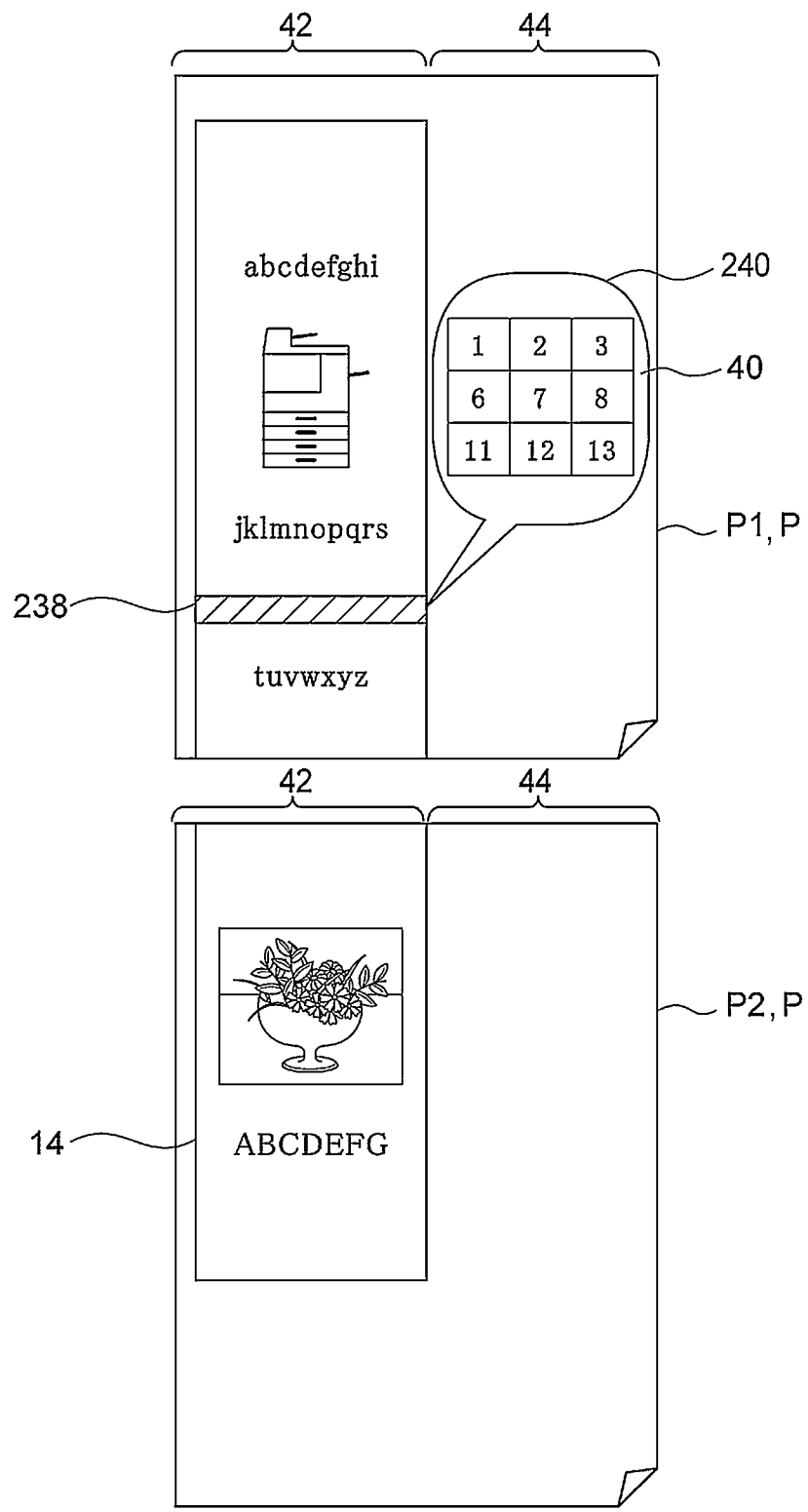
FIG. 13 illustrates an image based on content data output from an image processing apparatus according to a third exemplary embodiment of the present disclosure.

A CPU 231 (see FIG. 4) of an image processing apparatus 230 according to the third exemplary embodiment positions the content image 14 of FIG. 3 in the first area 42 of the recording medium P as illustrated in FIG. 13.

The CPU 231 positions the target image 40 to be positioned over two recording media P (see FIG. 6) in the second area 44, and replaces the target image 40 in the content image 14 positioned in the first area 42 with a different image 238 smaller than the original image. Thus, the CPU 231 has a function of vertically collapsing the target image 40 in the content image 14. Examples of the different image 238 include a shaded image and a grayscale image. The different image 238 indicates the original position of the target image 40.

The different image 238 may be reduced vertically on a scale of preferably ½, more preferably ⅓, and particularly preferably ¼ or less compared with the original image.

The CPU 231 positions an associative image 240 on the recording medium P. The associative image 240 associates the different image 238 with the target image 40 positioned in the second area 44. Specifically, the CPU 231 positions a word balloon on the recording medium P as the associative image 240.

Fourth Exemplary Embodiment

Next, examples of an image processing apparatus and an information processing program according to a fourth exemplary embodiment of the present disclosure are described with reference to FIG. 14. In the fourth exemplary embodiment, differences from the first exemplary embodiment are described below.

Figure 14:
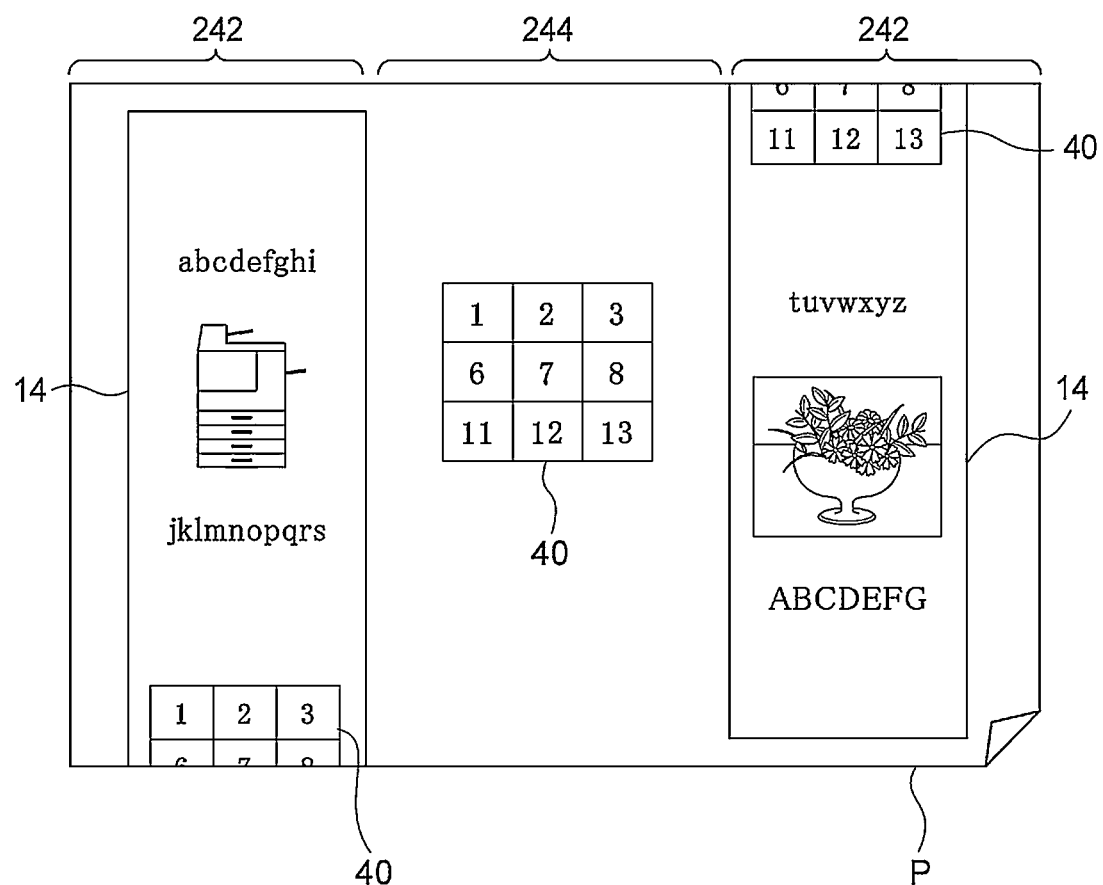
FIG. 14 illustrates an image based on content data output from an image processing apparatus according to a fourth exemplary embodiment of the present disclosure.

A CPU 331 (see FIG. 4) of an image processing apparatus 330 according to the fourth exemplary embodiment positions the content image 14 of FIG. 3 in first areas 242 of a recording medium P and positions the target image 40 in a second area 244 as illustrated in FIG. 14.

As illustrated in FIG. 14, the CPU 331 of the image processing apparatus 330 splits the entire recording medium P into three areas arranged in a long-side direction of the recording medium P (lateral direction in the drawing sheet). The CPU 331 defines two of the areas (right and left areas) as the first areas 242 and the central area as the second area 244. That is, the CPU 331 defines the first areas 242 and the second area 244 arranged in the width direction of the recording medium P.

The CPU 331 of the image processing apparatus 330 positions, in the second area 244, the target image 40 positioned over the two first areas 242.

In the exemplary embodiments described above, the user transmits content data displayed on the smartphone 10 to a selected image processing apparatus 30 by using a wireless LAN. For example, the user may transmit the content data to the selected image processing apparatus by using a cloud service.

Although description is not particularly made in the exemplary embodiments described above, the user may set the width dimension of the first area.

In the exemplary embodiments described above, the target image (object) selected to improve its visibility is an image positioned over two recording media P or a text image with its text size equal to or smaller than the threshold. For example, the target image may be a photograph or an underscored text.

In the exemplary embodiments described above, the content data is PDF data but may be HTML data or other data.

In the second and third exemplary embodiments, the word balloon is used as the associative image but an arrow or the like may be used as the associative image.

In the exemplary embodiments described above, the CPU 31 performs information processing by reading and executing software (program), but various processors other than the CPU may perform the information processing. The term "processor" refers to hardware in a broad sense. Examples of the processor include general processors (e.g., CPU: Central Processing Unit), dedicated processors (e.g., GPU: Graphics Processing Unit, ASIC: Application Integrated Circuit, FPGA: Field Programmable Gate Array, and programmable logic device). In the embodiments above, the term "processor" is broad enough to encompass one processor or plural processors in collaboration which are located physically apart from each other but may work cooperatively. The order of operations of the processor is not limited to one described in the embodiments above, and may be changed.

In the exemplary embodiments described above, the information processing program is prestored (preinstalled) in the ROM 32 or the storage 34 but is not limited thereto. The program may be provided by being recorded in a recording medium such as a compact disc read only memory (CD-ROM), a digital versatile disc read only memory (DVD-ROM), or a universal serial bus (USB) memory. Alternatively, the program may be downloaded from an external apparatus via a network.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An image processing apparatus comprising:
a processor configured to:
determine whether a length of a content image is greater than a width of the content image;
when the length is greater than the width, position the content image in a first area of a recording medium, the recording medium including a first recording medium and a second recording medium;
determine whether: (i) the content image in the first area contains a target image including a first partial image and a second partial image; (ii) the first partial image is positioned in the first recording medium; and (iii) the second partial image is positioned in the second recording medium; and
upon determining that the content image in the first area contains the target image including the first partial image positioned in the first recording medium and the second partial image positioned in the second recording medium, position an entirety of the target image in both a second area of the first recording medium and a second area of the second recording medium, the second area of the first recording medium and the second area of the second recording medium being different from the first area.

2. The image processing apparatus according to claim 1, wherein the processor is configured to define the first area and the second area arranged in a width direction of the recording medium.

3. The image processing apparatus according to claim 1, wherein the processor is configured to position the entirety of the target image on each of the first recording medium and the second recording medium.

4. The image processing apparatus according to claim 2, wherein the processor is configured to position the entirety of the target image on each of the first recording medium and the second recording medium.

5. The image processing apparatus according to claim 1, wherein the processor is configured to position an associative image on the recording medium, the associative image associating the target image contained in the content image with the target image positioned in the second area.

6. The image processing apparatus according to claim 2, wherein the processor is configured to position an associative image on the recording medium, the associative image associating the target image contained in the content image with the target image positioned in the second area.

7. The image processing apparatus according to claim 3, wherein the processor is configured to position an associative image on the recording medium, the associative image associating the target image contained in the content image with the target image positioned in the second area.

8. The image processing apparatus according to claim 4, wherein the processor is configured to position an associative image on the recording medium, the associative image associating the target image contained in the content image with the target image positioned in the second area.

9. A non-transitory computer readable medium storing an information processing program causing a computer to execute a process comprising:

determining whether a length of a content image is greater than a width of the content image;

when the length is greater than the width, positioning the content image in a first area of a recording medium, the recording medium including a first recording medium and a second recording medium;

determining whether: (i) the content image in the first area contains a target image including a first partial image and a second partial image; (ii) the first partial image is positioned in the first recording medium; and (iii) the second partial image is positioned in the second recording medium; and upon determining that the content image in the first area contains the target image including the first partial image positioned in the first recording medium and the second partial image positioned in the second recording medium, positioning an entirety of the target image in both a second area of the first recording medium and a second area of the second recording medium, the second area of the first recording medium and the second area of the second recording medium being different from the first area.

* * * * *